United States Patent Office 3,355,524
Patented Nov. 28, 1967

3,355,524
O,O-DIMETHYL-O-(3-CHLORO-4-ALKYLSUL-FAMOYLPHENYL)PHOSPHOROTHIOATES
Saichiro Kuramoto, Toyonaka-shi, Keimei Fujimoto, Minoo-shi, Yositosi Okuno, Nishinomiya-shi, Hideo Sakamoto, Itami-shi, Masataka Nakagawa, Yamato-takada-shi, and Toshio Mizutani, Amagasaki-shi, Japan, assignors to Sumitomo Chemical Company Ltd., Osaka, Japan, a corporation of Japan
No Drawing. Filed Mar. 16, 1964, Ser. No. 352,341
5 Claims. (Cl. 260—944)

The present invention relates to new organophosphorus compounds and to the insecticidal compositions containing the same. More particularly, the invention relates to phophorus compound having N-monoalkylsulfamoylchlorophenyl radical and having the general formula

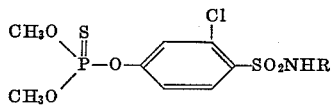

wherein R is a member selected from the group consisting of methyl, ethyl and isopropyl radicals, and to the new insecticidal compositions containing the said compound as essential active ingredient.

Further, the present invention relates to a method for producing the above mentioned compounds, comprising condensing O,O-dimethyl phosphorochloridothioate with a 4-N-monoalkylsulfamoyl-3-chlorophenol or its alkali metal salt having the general formula

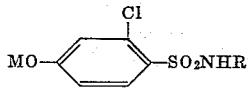

wherein M is a member selected from the group consisting of hydrogen and alkali metal atoms, and R is a member selected from the group consisting of methyl, ethyl and isopropyl radicals.

The compounds of the invention are of particular value in destruction of agriculturally injurious insects, such as Lepidoptera, Diptera and Coleoptera, especially borers of rice, for example, rice stem borer (*Chilo suppressalis* Walker), paddy borer (*Schoenobius incertellus* Walker), purplish stem borer (*Sesamina inferens* Walker), and others (such as *Chilo plejadellus* Zinck, *Chilotrea polychrysa* Meyr, *Scirpophaga albinello* Cramer, *Scirpophaga innotata* Walker, *Eldana dichromellus* Walker and *Elasmopalpus lignosellus* Zeller), and sanitary injurious insects, especially house fly (*Musca domestica* Linne), and its larva, and the like. The new organophosphorus compounds have not only a very high insecticidal activity but has at the same time a very low toxicity to warm-blooded animals.

Accordingly, an object of the present invention is to provide new organophosphorus compounds which are very useful as essential active ingredients of pesticidal composition and further have a characteristic of long residual effect with economical advantage. Another object of the invention is to provide insecticidal composition suitable for agricultural and sanitary uses which have an extremely lower order of toxicity towards warm-blooded animals, but has a very higher degree of insecticidal activity, compared with that of the conventional insecticides. Other objects and advantages will be apparent from the description stated hereunder.

It is well known that organophosphoric acid esters having 4-nitrophenyl radical, for example, parathion and methyl parathion, possess a high degree of insecticidal activity and consequently are very useful as the active ingredient in insecticidal compositions. However, they have, at the same time, a very high degree of toxicity towards warm-blooded animals and this is, indeed, the disadvantage of these compounds. Therefore, many attempts have been made to find compounds having lower toxicity and higher insecticidal activity and compounds such as Chlorthion and Dicapton have been found as the results of their efforts. However, these so-called low toxicity insecticidal compounds are nevertheless less satisfactory than is desired from the standpoint of insecticidal activity, residual effect and insecticidal spectrum.

The present inventors have made various studies for the purpose of obtaining the compounds which had a low toxicity, a long residual effect, and also a high degree of insecticidal activity, such compound being anxiously desired in rice producing districts. As the results, the inventors have succeeded in obtaining the present compounds which have not only the extremely low toxicity but also the superior activity towards insects extensively, compared with that of any conventional insecticidal compounds.

The organophosphorus compounds according to the present invention, having the general formula

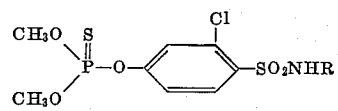

wherein R has the same meaning as above-identified, are new compounds unknown in any of preceding literatures. In order to produce the compounds according to the invention, O,O-dimethyl phosphorochloridothioate is condensed with a phenol compound having the general formula

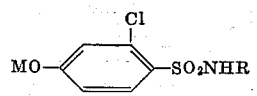

wherein M and R have the same meanings as above-identified.

O,O-dimethylphosphorochloridothioate having the following formula

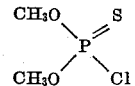

(B.P. 70°–71° C./20 mm., $n_D^{21}$ 1.4786)

may be prepared according to the known processes, for example, according to the process disclosed in J. Am. Chem. Soc. 72, 2461 (1950), Chem. Abst. 53, 1205, ibid., 52, 294.

The 4-N - monoalkylsulfamoyl - 3 - chlorophenol compounds employed in the process of the invention and having the general formula

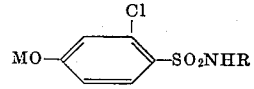

wherein M is a member selected from the group consisting of hydrogen and alkali metal atoms, and R is a member selected from the group consisting of methyl, ethyl and isopropyl radicals, may be prepared from 4-N-monoalkylsulfamoyl-3-chloroanilines by diazotization according to the known procedures, for example, according to the process as disclosed in Organic Syntheses vol. 23, p. 11.

The compounds which fall within this scope of definition include the following compounds.

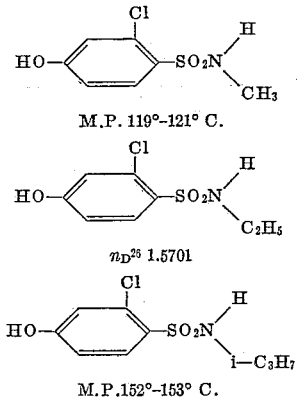

M.P. 119°–121° C.

$n_D^{25}$ 1.5701

M.P. 152°–153° C.

These phenols may be converted to the alkali salts, for example, by contacting with a caustic alkali, metallic alkali, alkali metal alcoholate, and the like, in water or an organic solvent. The alkali may be sodium, potassium, or others.

In the method of this invention, the condensation reaction of these raw materials may successfully be carried out by mixing the both parties at the ratio of at least equal molecular weights, or if possible with excess of the phosphorus chloride compound. In this case, it is preferable to carry out the reaction in an inert organic solvent by use of almost equimolar quantities of the said two compounds in general. For example, when the phosphorus chloride compound is mixed with an alkali metal phenolate in an inert organic solvent and then heated, a de-alkali metal chloride reaction takes place and the compound of this invention can be produced as the result. When the free phenol is utilized in place of the said alkali metal phenolate, the present reaction proceeds according to the so-called de-hydrogen chloride reaction, and in such case, the said reaction may preferably be carried out in the presence of a well known de-acid agent, for example, such organic bases as pyridine and diethylamine, such alkali metal carbonates as sodium carbonate and potassium carbonate, such alkali metal bircarbonates as sodium bicarbonate and potassium bicarbonate, and ammonium bicarbonate. The inert organic solvent utilized in the present reaction may include any kind of well known solvent, provided that it does not affect the present reaction, for example hydrocarbon solvents, such as benzene, toluene and xylene, halogenated hydrocarbon solvents, such as chlorobenzene and o-dichlorobenzene, alcohols, such as ethanol and isopropanol, ketones, such as acetone, methyl ethyl ketone and methyl isobutyl ketone and others. Though the present reaction may proceed in the broad temperature range of from room temperature at 120 C., for example, only by standing the reaction mixture at the room temperature for a long period of time, it is in general preferable to heat the mixture at a temperature between 60° and 100° C., at which the reaction completes within several hours. Furthermore, the present reaction is preferably carried out in the presence of catalyst such as copper powder and cuprous salts, in good yield.

When the reaction is over, the precipitated alkali metal chloride or hydrochloric acid salt of organic base is filtered off, or alternatively, an adequate quantity of water is added to the reaction mixture to dissolve the by-produced salts and the water layer is separated off, and then the organic layer is well washed with water and evaporated in vacuo to obtain the objective compound as residue in good yield. By the above-mentioned procedure, a sufficiently pure compound for most of practical use may be obtained, but, if necessary, thus obtained compound may be further purified.

The compounds of the following formula

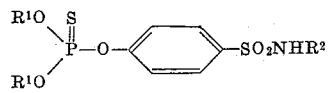

wherein $R^1$ is a lower alkyl radical of from 1 to 4 carbon atoms and $R^2$ is a lower alkyl radical of from 1 to 6 carbon atoms, are already disclosed in the specifications of U.S. Patent No. 3,005,004 and German Patents No. 1,039,070 and 1,044,826 prior to the present invention, but the series of those known compounds are not as yet satisfactory in the insecticidal activities and toxicities to the warm-blooded animals. The improvement in the activities and toxicities was first made by the present inventors by introducing chlororadical into the 3-position of the phenol nucleus. And as to the alkyl radicals bound to the oxygen atoms, methyl radicals were found to be most effective.

The Table 1 sets forth the efficacies and toxicities of the present compounds comparing with the others.

TABLE 1

| | Azuki bean weevils, dipping, $LC_{50}$ (p.p.m.) [1] | Relative efficacy towards rice stem borer, pot test [2] | Oral toxicity towards mice $LD_{50}$ (mg./kg.) |
|---|---|---|---|
| $CH_3O$–P(=S)(–$OCH_3$)–O–C₆H₄–$SO_2NHCH_3$ | 480 | 33 | 15 |
| $CH_3O$–P(=S)(–$OCH_3$)–O–C₆H₃(Cl)–$SO_2NHCH_3$ (Cl ortho to O) | 200 | 20 | 30 |
| $CH_3O$–P(=S)(–$OCH_3$)–O–C₆H₃(Cl)–$SO_2NHCH_3$ (present compound) | 80 | 50 | 200 |
| $CH_3O$–P(=S)(–$OCH_3$)–O–C₆H₄–$SO_2NHC_2H_5$ | 1,000 | 25 | 30 |

TABLE 1—Continued

| | Azuki bean weevils, dipping, $LC_{50}$ (p.p.m.) [1] | Relative efficacy towards rice stem borer, pot test [2] | Oral toxicity towards mice $LD_{50}$ (mg./kg.) |
|---|---|---|---|
| $(CH_3O)_2P(S)-O-C_6H_3(Cl)-SO_2NHC_2H_5$ (3-Cl) | 500 | 20 | 40 |
| $(CH_3O)_2P(S)-O-C_6H_3(Cl)-SO_2NHC_2H_5$ (2-Cl) (present compound) | 200 | 100 | 70 |
| $(CH_3O)_2P(S)-O-C_6H_4-SO_2NHi-C_3H_7$ | 230 | 10 | 200 |
| $(CH_3O)_2P(S)-O-C_6H_3(Cl)-SO_2NHi-C_3H_7$ (3-Cl) | 100 | 50 | 200 |
| $(CH_3O)_2P(S)-O-C_6H_3(Cl)-SO_2NHi-C_3H_7$ (2-Cl) (present compound) | 20 | 100 | 300 |
| $(C_2H_5O)_2P(S)-O-C_6H_4-SO_2NHCH_3$ | 300 | 50 | 10 |
| $(C_2H_5O)_2P(S)-O-C_6H_4-SO_2NHC_2H_5$ | 200 | 50 | 13 |
| $(C_2H_5O)_2P(S)-O-C_6H_4-SO_2NHi-C_3H_7$ | 70 | 10 | 40 |

[1] The dipping test was conducted by using Azuki bean weevils as follows. An emulsifiable concentrate of each compound was prepared and the concentrate was diluted with water to obtain various concentrations of the test emulsions (ca. 1/100–1/100000). To these emulsions, each group of 30 weevils was dipped for 1 minute and then transferred to a Petri dish having a sheet of filter paper at the bottom. After standing overnight at 25° C., the dead and the survival numbers of the weevils were counted. This experiment was triplicated and the $LC_{50}$ value was calculated, based upon the concentration utilized and the kill percent, on each compound.

[2] "The relative efficacy towards rice stem borer" was determined by the so-called pot test by spraying the test medium on the second-generation larvae of the insect and each value was determined by comparing the efficacy of the test compound towards rice stem borer with that of parathion (=100). The pot test was conducted by the following manner. The rice plants, 45–50 days from planting, were transplanted into a Wagner pot (whose surface area was 10 are ×1/50000) and after a further 60–70 days the plants were infected with the eggs of rice stem borer. Thus treated pots were settled in a hatching room. After 4 days from the hatching of the insects, each pot was sprayed with an emulsion of the test compound made by aqueous dilution of a 50% emulsifiable concentrate composition (comprised of 50 parts active ingredient, 35 parts Triton X-100 (a polyethylene glycol nonylphenyl-ether) and 15 parts xylene, by weight).

In order to put the phosphorothioates of the present invention into practical use, various inert carriers may be combined therewith to make an insecticidal composition containing a toxic quantity of at least one of the said compounds. As for the said compositions, such formulations as emulsion, suspension, dust, oil and granule preparations may be included.

An emulsion preparation of the compounds of the invention may be prepared, for example, by mixing the compound with at least one of organic solvents and an emulsifier in a proper proportion to make an emulsifiable concentrate and by diluting the thus obtained concentrate with water at the time of use. As the organic solvent, an aromatic hydrocarbon such as benzene and xylene is preferred, and as the emulsifier, in general, either a nonionic or a blend of nonionic and anionic surface active agents may be suitable. The mixing ratio of these ingredients can be selected according to the material to be utilized and to the object of the preparation. However, in general, 25–50 weight parts of the compound of the present invention may be combined with 50–10 weight parts of a solvent and 25–40 weight parts of a surface active agent to obtain a good emulsifiable concentrate. In some cases, the compound of the present invention may be combined merely with a surface active agent to obtain an emulsifiable concentrate. At the time of use, the said concentrate is diluted with an adequate quantity of water to make an emulsion and the thus obtained emulsion is sprayed directly.

To provide a wettable powder, the compound of the present invention is mixed with a wetting agent and is further combined with a powdered carrier. As the wetting agent, either a nonionic or a blend of nonionic and anionic surface active agents may successfully be employed, and as the powdered carrier, such carriers as talc, kaolin, diatomaceous earth and synthetic silicate may be utilized. The powdered carrier preferably has a particle size of 200 mesh through (British Standard). The mixing ratio of the ingredients of the wettable powder may be from 5 to 25 weight percent of the compound of the present invention, from 1 to 10 weight percent of the surface active agent and the remaining weight percent of the powdered carrier, but these ratios may freely be varied in accordance with the particular use to which the preparation is to be put. A suitable suspension for practical use may easily be prepared from the said wettable powders merely by putting them into water.

By mixing the present compound with a powdered carrier, a dust formulation may be obtained. It may be prepared by admixing the ingredients directly, but preferably the compound of the present invention may be dissolved into a solvent having a low boiling point, the solution admixed with the carrier, and the solvent evaporated off, to obtain a dust. The dust formulation preferably contains from 1 to 5% by weight of the active compound of the invention. Any of the materials described for use in the production of the wettable powders may be used as carrier in such dust formulations.

Further, the compound of the invention may be dissolved in a solvent such as deodorized kerosene to make an oil preparation. The solubility in kerosene of the present compound is poor and an auxiliary solvent may be used. Suitable auxiliary solvents are aromatic hydrocarbon solvents such as benzene, xylene and methylnaphthalene.

Still further, a granule preparation of the compound of the present invention may be prepared, for example, by mixing the compound with a surface active agent and a powdered carrier, kneading the resulting mixture together with polyvinyl alcohol and water, molding and drying the resulting product, the nonionic surface active agent and the powdered carrier being the same as above-explained.

As for the manufacturing method of the insecticide containing the compound of this invention, it would be apparently known to those skilled in the art that any recipe other than those described above may be utilized according to the common methods for preparing organophosphorus insecticides. Moreover, the insecticidal compositions of the present invention may satisfactorily be compounded with other material such as an active ingredient of another type of insecticide, such as organophosphorus insecticide, organochlorine insecticide, carbamate insecticide and pyrethroid insecticide, an acaricidal, nematocidal, fungicidal and herbicidal components, a fertilizer and an earth improving material, so far as it is compatible with the compound of the invention, to make a multipurpose composition.

The present invention will be illustrated by the following examples, without, however, being limited thereto.

*Example 1*

To a mixture of 11.0 g. of 3-chloro-4-N-methylsulfamoylphenol and 7 g. of anhydrous potassium carbonate in 100 ml. of toluene, 8 g. of O,O-dimethyl phosphorochloridothioate is added dropwise at room temperature. After the dropping is finished, the mixture is kept for a while at the temperature and heated to about 80° C. for additional 3 hours, while being stirred. After cooling to room temperature, the mixture is filtered to remove the solid substances, and the organic solvent layer is washed with water, with a dilute aqueous sodium carbonate solution, and again with water, followed by drying on anhydrous sodium sulfate.

The toluene solvent is distilled off in vacuo, to leave crystalline O,O-dimethyl-O-(3-chloro-4-N-methylsulfamoylphenyl) phosphorothioate, which weighs 13 g. and melts at 120°–121° C.

*Analysis.*—Calcd. (for $C_9H_{13}ClNO_5PS_2$): N, 4.05%; P, 8.97%; S, 18.52%. Found: N, 4.02%; P, 9.05%; S, 18.61%.

*Example 2*

To a mixture of 8 g. of O,O-dimethyl phosphorochloridothioate, 12 g. of 3-chloro-4-N-ethylsulfamoylphenol and a small amount of cuprous chloride in 100 ml. of toluene, 7 g. of anhydrous potassium carbonate is added at about 70° C. while being stirred, while the exothermic reaction proceeds violently. After the reaction is continued for about 2 hours, the mixture is cooled and filtered to remove the solid substances. The organic solvent layer is washed with water, with a dilute aqueous sodium carbonate solution, and again with water, followed by drying on anhydrous sodium sulfate.

The toluene solvent is distilled off in vacuo, to leave 13 g. of O,O-dimethyl-O-(3-chloro-4-N-ethylsulfamoylphenyl) phosphorothioate, which is purified through chromatography of active alumina for analysis.

*Analysis.*—Calcd. (for $C_{10}H_{15}ClNO_5PS_2$); N, 3.89%; P, 8.62%; S, 17.80%. Found: N, 3.79%; P, 8.83%; S, 17.91%.

*Example 3*

Twenty-five grams of O,O-dimethyl-O-(3-chloro-4-methylsulfamoylphenyl) phosphorothioate is combined with 30 g. of Triton X–100 and 45 g. of xylene to make a uniform emulsifiable concentrate.

*Example 4*

Twenty grams of O,O-dimethyl-O-(3-chloro-4-ethylsulfamoylphenyl) phosphorothioate is combined with 20 g. of Triton X–100 and 60 g. of xylene to make a uniform emulsifiable concentrate.

*Example 5*

Three grams of O,O-dimethyl-O-(3-chloro-4-ethylsulfamoyl-phenyl) phosphorothioate is mixed by stirring with 97 g. of talc to make a dust preparation.

*Example 6*

Twenty-five grams of O,O-dimethyl-O-(3-chloro-4-isopropylsulfamoylphenyl) phosphorothioate is combined with 20 g. of Triton X–100 and 55 g. of xylene to make a uniform emulsifiable concentrate.

*Example 7*

One gram of O,O-dimethyl-O-(3-chloro-4-isopropylsulfamoylphenyl) phosphorthioate is dissolved into 99 g. of kerosene to make an oil preparation.

*Example 8*

Three grams of O,O,-dimethyl-O-(3-chloro-4-isopropylsulfamoylphenyl) phosphorothioate is mixed with 97 g. of a mixture containing equal amount of kaoline and talc to make a dust preparation.

*Example 9*

Five grams of O,O-dimethyl-O-(3-chloro-4-isopropylsulfamoylphenyl)phosphorothioate is mixed with 1 g. of Triton X–100 and 92 g. of talc, kneaded the mixture with 2 g. of polyvinyl alcohol and a small amount of water, moulded and dried the product, to make a granule preparation.

*Example 10*

*Field test.*—A customary rice plant field having area of 15 ares is divided into 15 blocks, and an aqueous emulsion in a concentration shown in the following Table 2 is sprayed to each block to test the insecticidal activity of each compound to the larvae of rice stem borer.

The spray is conducted after 10 days from the peak of adult-emerging stage and during the first tillering stage of rice plants, in an amount of 7 l./are with respect to the 3 blocks.

The rice plant tested is of "Iwaimochi" variety. The effectiveness of the test compounds is judged by randomly sampling 50 stocks from about 200 stocks of the rice plants in each block after 10 days from the spray, and counting the numbers of the living larvae of the rice stem borers and the damaged hearts of the plants. The ratio of the damaged heart is the number of the damaged hearts divided by the total stems (in 50 stocks) and multiplied by 100.

In the Table 2, the average value of the ratio of the damaged heart in 3 blocks, and the total number of the larvae of rice stem borers found alive in 3 blocks, are shown.

TABLE 2

| Test formulations | Concentration of the actual ingredient (p.p.m.) | Ratio of damaged heart (Percent) | Total number of the insects found alive in 3 blocks |
|---|---|---|---|
| Nontreatment | | 12.5 | 68 |
| Methyl parathion (50% emulsifiable concentrate) | 250 | 4.5 | 21 |
| Example 3 | 250 | 2.3 | 18 |
| Example 4 | 250 | 1.9 | 11 |
| Example 6 | 250 | 1.8 | 10 |

*Example 11*

Residual effect test.—Rice plants are seeded in Wagner pots (the surface area being 10 are×1/50,000), and, 50 days after the germination, the test compound formulated in a concentration shown in the Table 3 is sprayed in an amount of 10 ml./pot. Each 3, 5, 7 and 10 days after the spray, the plants are infected with eggs of rice stem borer, and the mortalities of the hatched larvae of rice stem borer are abserved.

The efficacy for a longer period after the spray means longer residual effect.

TABLE 3

| Test formulation | Concentration of the actual ingredient (p.p.m.) | Mortality of the hatched larvae of rice stem borer after the spray (percent) | | | |
|---|---|---|---|---|---|
| | | 3 days | 5 days | 7 days | 10 days |
| Nontreatment | | 6 | 7 | 3 | 5 |
| Methyl parathion (50% emulsifiable concentrate) | 250 | 100 | 60 | 42 | 3 |
| Example 3 | 250 | 100 | 100 | 70 | 20 |
| Example 4 | 250 | 100 | 100 | 88 | 57 |
| Example 6 | 250 | 100 | 100 | 98 | 73 |

*Example 12*

Effectiveness of dust preparation.—The rice plants after 50 days from the germination, transplanted to Wagner pots (surface area being 10 ares×1/50,000) are infected with eggs of rice stem borer. After 3 days from the hatching of the insects, the rice plants are sprayed with a dust preparation of the test compound in an amount shown in the Table 4. The mortalities of the insects are observed after 5 days from the spray.

TABLE 4

| Test compound and the formulation | Amount sprayed (mg./pot) | Mortality of the rice stem borer (percent) |
|---|---|---|
| Nontreatment | | 6 |
| Dipterex (4% dust) | 50 | 70 |
| | 100 | 95 |
| Example 5 | 50 | 81 |
| | 100 | 100 |
| Example 8 | 50 | 68 |
| | 100 | 99 |

*Example 13*

Effectiveness of oil preparation.—Waste bait from which the breeded larvae of house fly have been pupated is mixed with sugar, and the mixture is distributed into beakers of about 300 ml. volume in each 200 g. amount per beaker. Then, a 1% oil preparation is sprayed onto the surface of the bait in an amount of 1 ml./beaker. The beakers are placed in a cage, and adult house flies (4 days after emergence) are set free therein. The mortalities are observed at intervals. The results are given in Table 5 .

TABLE 5

| Test formulation | Mortality of the house fly after the spray (percent) | | | | |
|---|---|---|---|---|---|
| | 1 day | 3 days | 5 days | 7 days | 10 days |
| Nontreatment | 7 | 3 | 10 | 4 | 4 |
| Marathon (1% oil preparation) | 98 | 30 | 10 | 5 | 5 |
| Example 7 | 100 | 95 | 100 | 70 | 10 |

What we claim is:
1. A compound of the formula

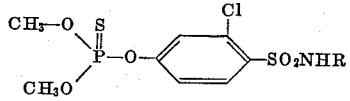

where R is lower alkyl.

2. A thionophosphorus compound having the formula,

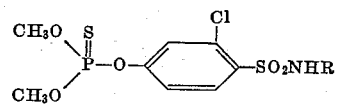

wherein R is a member selected from the group consisting of methyl, ethyl and isopropyl.

3. O,O - dimethyl - O - (3 - chloro - 4 - methylsulfamoylphenyl) phosphorothioate.

4. O,O - dimethyl - O - (3 - chloro - 4 - ethylsulfamoylphenyl) phosphorothioate.

5. O,O - dimethyl - O - (3 - chloro - 4 - isopropylsulfamoylphenyl) phosphorothioate.

References Cited

UNITED STATES PATENTS 2,701,259   2/1955   Schrader _____ 260—944
3,005,004   10/1961  Berkelhammer ____ 260—944
3,042,703   7/1962   Schegk et al. _____ 260—944

FOREIGN PATENTS 1,039,070   9/1958   Germany.
1,044,826   11/1958  Germany.

OTHER REFERENCES

Sumitomo: "Chem. Abst.," vol. 57, Col. 15560 (d) (Dec. 10, 1962).

CHARLES B. PARKER, *Primary Examiner.*

F. M. SIKORA, B. BILLIAN, *Assistant Examiners.*